Jan. 11, 1966  W. ROSENBERG  3,228,561
ELECTRONIC FEEDING AND PROPORTIONING APPARATUS
FOR FLUENT MATERIALS
Filed Nov. 1, 1962  3 Sheets-Sheet 1

Walter Rosenberg
INVENTOR.

BY Eugene D Farley

Atty.

Jan. 11, 1966 W. ROSENBERG 3,228,561
ELECTRONIC FEEDING AND PROPORTIONING APPARATUS
FOR FLUENT MATERIALS
Filed Nov. 1, 1962 3 Sheets-Sheet 2
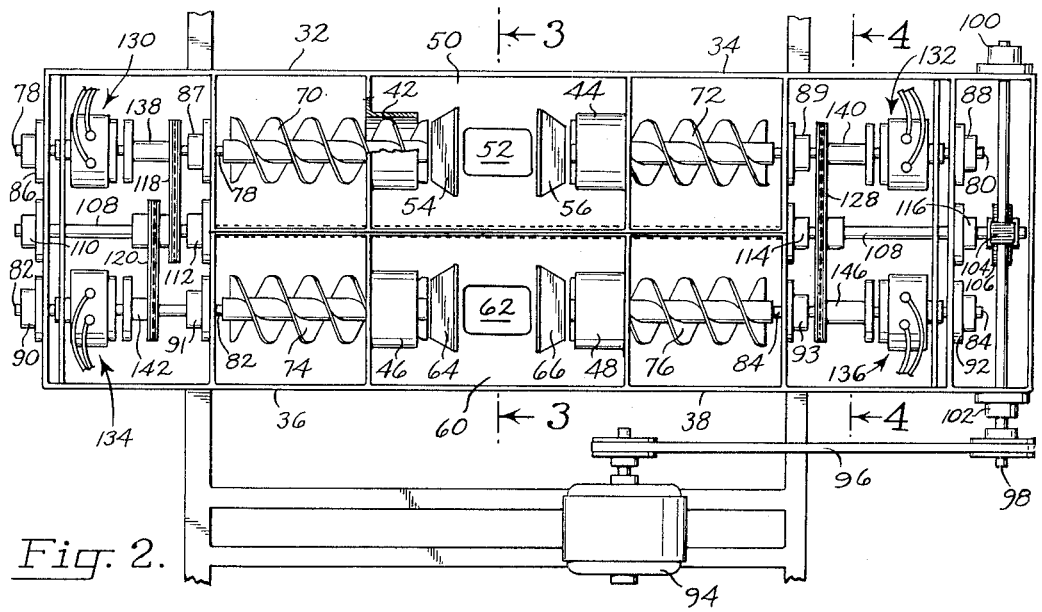
Fig. 2.
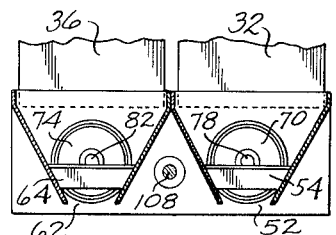
Fig. 3.
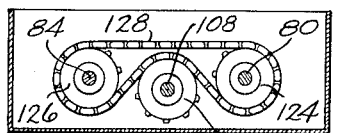
Fig. 4.
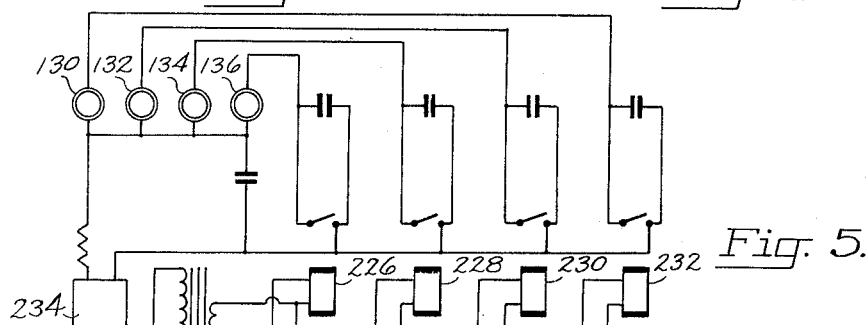
Walter Rosenberg
INVENTOR.
BY Eugene D. Farley
Atty.

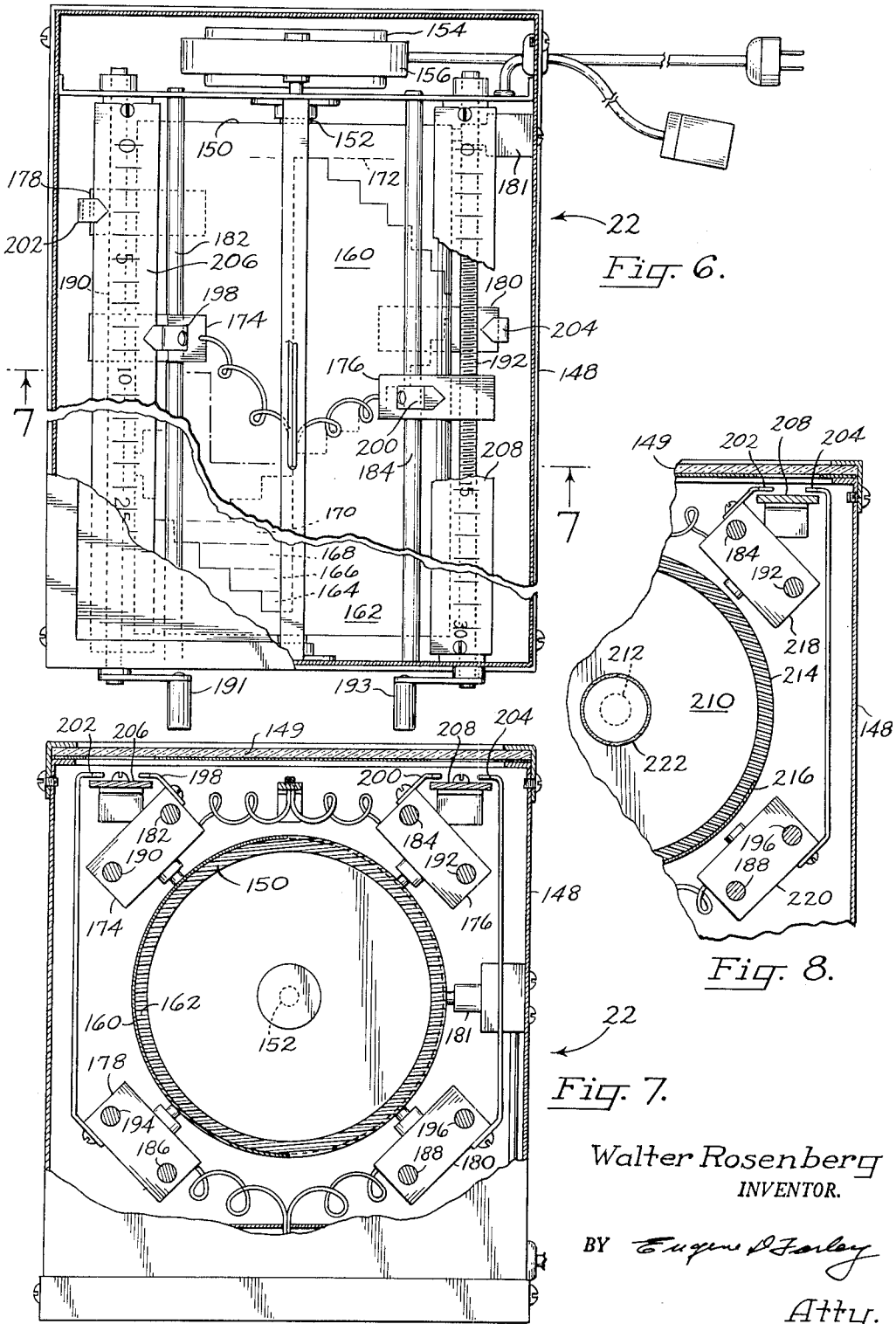

3,228,561
ELECTRONIC FEEDING AND PROPORTIONING APPARATUS FOR FLUENT MATERIALS
Walter Rosenberg, Cinebar, Wash., assignor of one-half to Price Hobgood, Bryan, Tex.
Filed Nov. 1, 1962, Ser. No. 234,649
15 Claims. (Cl. 222—70)

This invention relates to electronic apparatus for feeding and proportioning both liquid and solid fluent materials.

In the agricultural, chemical and other industries, there is frequent need for apparatus which may be used to deliver fluent solid and liquid materials at a predetermined flow and also for forming mixtures of such materials in accordance with a predetermined formula. Thus in the raising of animals it is necessary to provide feed mixtures containing various grains and other nutritional components. In the chemical industry it frequently is necessary to mix various proportions of insecticides or other chemicals in powder or granular form in order to provide a finished commercial composition of desired properties. Also, it often is desired to mix liquid materials to form liquid products of varying composition and characteristics.

It is the general object of this invention to provide apparatus which will thus deliver fluent solid or liquid materials in controlled flow, proportioning them if desired, and discharging them to a common station where they may be blended, mixed, ground, packaged or otherwise processed.

Other objects and advantages of the present invention are the provision of such apparatus which is versatile in its application to a wide variety of materials, which is highly accurate, which is easily adjustable, which is readily adapted for association with mixers, grinders and other processing apparatus, which does not bleed when inoperative, which is durable and relatively trouble free, which may be controlled from remote stations and which, while measuring volumetrically, may be calibrated for gravimetric deliveries.

The manner in which the foregoing and other objects of this invention are accomplished will be apparent from the accompanying specification and claims considered together with the drawings, wherein:

FIG. 2 is a plan view of the feeding and proportioning unit incorporated in the mill of FIG. 1;

Figure 1:
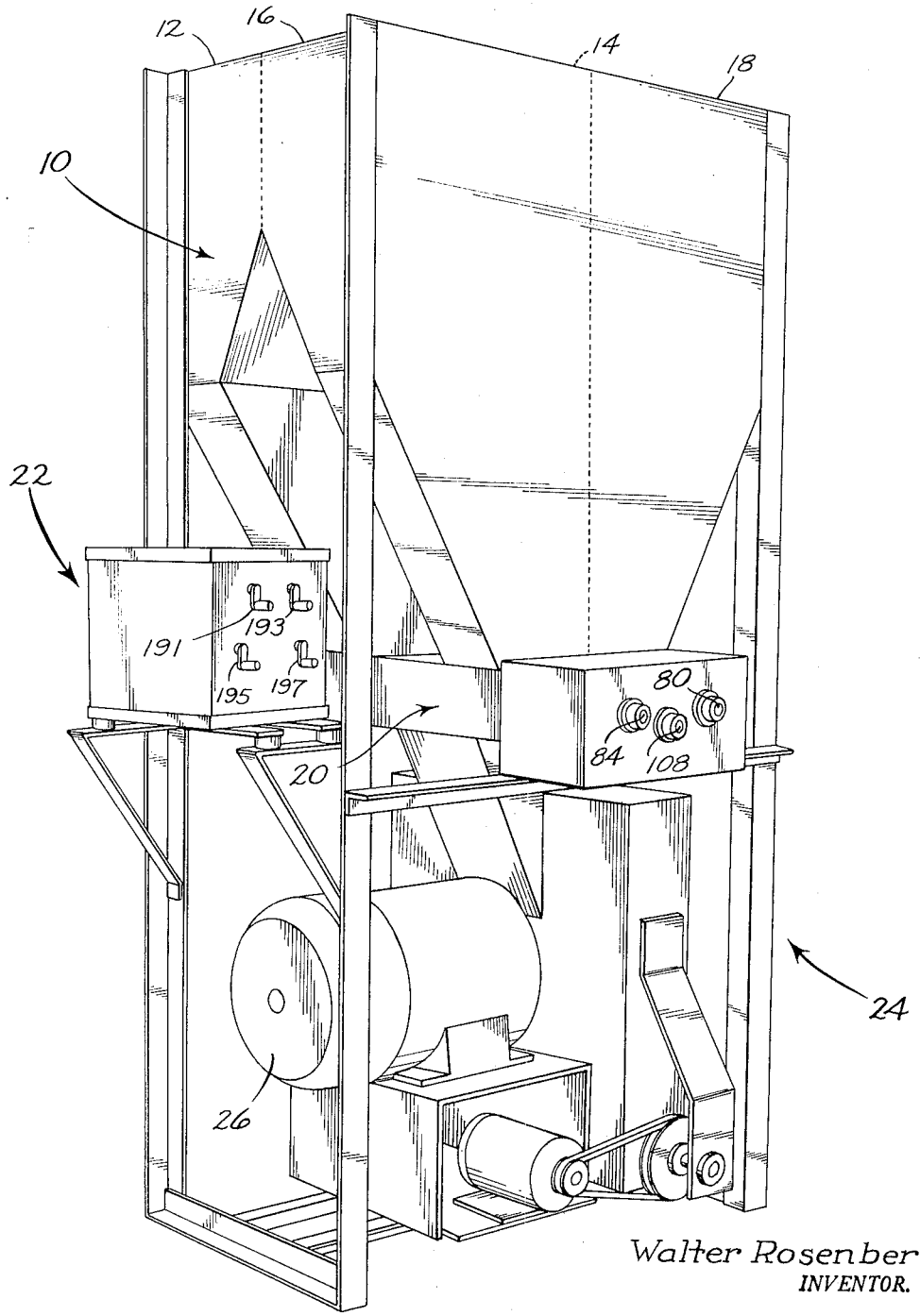
FIG. 1 is a view in perspective of a mill assembly incorporating the electronic feeding and proportioning apparatus of the present invention.

FIGS. 3 and 4 are transverse sectional views taken along lines 3—3 and 4—4 respectively of FIG. 2;

FIG. 5 is a schematic circuit diagram of the electric circuit employed in the apparatus of the preceding figures;

FIGS. 6 and 7 are plan and transverse sectional views respectively of rotary drum electric switch means employed in the operation of the herein described apparatus, FIG. 6 being taken along line 7—7 of FIG. 6, and FIG. 8 is a fragmentary sectional view, corresponding to FIG. 7, but illustrating the application of a light-actuated electric switch in the herein described apparatus.

Broadly stated, the electronic feeding and proportioning apparatus of my invention comprises the combination of a container adapted to hold a fluent material and having a discharge opening, electrically operated valve means positioned in the discharge opening, an electric circuit including the valve means, and rotary drum electric switch means also in the electric circuit.

The electric switch means in turn broadly comprises a drum having on its periphery an area of conducting material providing parallel circumferential paths of varying but predetermined length. Electric circuit altering means responsive to the conducting means are mounted adjustably for stationing the altering means in operative relation to a selected one of the travel paths of the conducting material.

The altering means may comprise either electric brushes or similar contact members establishing an electric circuit, or photoelectric cell means accomplishing the same purpose. In either case, upon movement of the alternating means relative to the drum, the alternating means is energized for a time interval commensurate with the length of the selected travel path on the drum. This in turn actuates the valve means to deliver the material in metered, proportioned flow.

Considering the foregoing in greater detail and with particular reference to the drawings:

As shown in FIG. 1, the presently described apparatus may be included in a grinding or roller mill assembly used to proportion agricultural feeds, to mix them, and to grind them, thus delivering from the mill a feed mixture composed of ingredients blended together in predetermined proportions. In the illustrated form of the invention the mill comprises a hopper 10, divided into four separate compartments 12, 14, 16, 18 each having sloping sides directing the fluent, solid contents toward an opening in the bottom of the compartment.

These compartments feed into the proportioning unit of the assembly, indicated generally at 20, which is controlled by switch unit 22 and which delivers the proportioned feed into a grinding unit, indicated generally at 24, driven by motor 26. The proportioned and blended product then is discharged from the grinding unit and applied to its intended use.

The proportioning unit of the foregoing assembly is illustrated particularly in FIG. 2. It may include one or more compartments 32, 34, 36 and 38 which register with, and are fed by, hoppers 12, 14, 16 and 18 in the composite hopper assembly. The compartments are provided with inwardly directed discharge conduits 42, 44, 46, 48.

Conduits 42 and 44 discharge into a compartment 50 having sidewalls which slope downwardly into a discharge opening 52, leading to grinding unit 24. Baffles 54, 56 are mounted opposite the conduits, spanning the compartment to prevent bleeding of the feed hopper contents downwardly through discharge opening 52 when the mill is idle.

Similarly, discharge conduits 46, 48 discharge into a compartment 60 which is formed with sloping sides converging downwardly into discharge opening 62. Like opening 52, the latter opening communicates with grinding unit 24. Also, there are provided in compartment 60 baffles 64, 66 which extend between the sidewalls of the compartment opposite the discharge opening to prevent inadvertent bleeding of the feed material through the discharge conduits when the mill is not in operation.

In each of compartments 32, 34, 36, 38 there is mounted valve means for discharging the contents of the chamber to its associated conduit. In the illustrated form of the invention, such means are designed for valving solid fluent materials and comprise screw conveyors 70, 72, 74, 76. These are mounted on shafts 78, 80, 82, 84 which are journaled, respectively, in bearing pairs 86–87, 88–89, 90–91 and 92–93. Thus mounted, the screws work in their respective compartments conveying the solid contents thereof outwardly through the discharge conduits.

Screws 70, 72, 74, 76 are driven individually and adjustably by the drive illustrated in FIGS. 2 and 4.

A motor 94 and belt 96 drive a shaft 98 journaled in bearings 100, 102. The central portion of shaft 98 mounts a worm gear 104. This meshes with a spur gear 106 fixed to the end of centrally located drive shaft 108. The latter shaft is journaled in bearings 110, 112, 114, 116 and furnishes the power for driving the screw conveyors.

Thus screw conveyor 70 is driven by chain and sprocket assembly 118 and screw conveyor 74 by chain and sprocket assembly 120. Similarly, on the other side of the apparatus, screw conveyors 72, 76 are driven by a reversing chain and sprocket assembly including sprocket 122 on drive shaft 108, sprocket 124 on shaft 80, sprocket 126 on shaft 84 and chain 128 (FIG. 4). All four of the screw conveyors 70, 72, 74, 76 thus are driven from a common source in a direction such as to discharge the contents of the respective bins in which they work into the common discharge openings.

Means are provided for driving each screw conveyor individually for an adjustable period of time as required to deliver proportioned amounts of the feed material.

Accordingly there are provided, in association with each conveyor, magnetic clutch assemblies indicated generally at 130, 132, 134, 136. Magnetic clutches 130, 132, 134, 136 are connected to the source of power through hollow shafts 138, 140, 142, 146 respectively, these being connected to common drive shaft 108 by means of chain and sprocket assemblies 118, 120, 128 heretofore described.

The operation of the magnetic clutches is controlled through control unit 22 (FIG. 1) which includes electric switch means, the construction of which and circuit for which are illustrated particularly in FIGS. 5, 6, and 7.

Mounted for rotation within a housing 148 provided with a window 149 is a rotary drum 150 fixed to a shaft 152. The drum is driven at a controlled rate of speed by means of electric motor 154 and gear reducer 156.

The drum is provided with a peripheral area of conducting material, this being electrical conducting material 160 in the embodiment of FIGS. 5-7. The electrically conducting material is mounted on an electrically insulating base 162.

The longitudinal side edges of electrically conducting area 160 are stepped to provided a plurality of electrically conducting pathways or segments, some of which are indicated at 164, 166, 168, 170 and 172.

These pathways are provided in lengths determined by the stepping and varying as required for particular installations. In the case of a feedmill for stock feed processing there may be, for example, 30 pathways having an arc length from 0°–360° in 12° increments, pathways 164 presenting an increment of but 12° and pathway 172 representing an increment of the full 360°.

The electrically conducting material 160 is in an electric circuit with the magnetic clutches, as well as with electric circuit altering means which in the embodiment of FIGS. 6 and 7 comprise electric brushes 174, 176, 178, 180, one for each clutch.

The brushes are in a circuit with a grand brush 181. They have a width approximately equal to the width of the segments of pathways of conducting material 160. They are mounted for adjustment longitudinally relative to drum 150 so that they may be registered with selected ones of the pathways.

Accordingly the brush assemblies are mounted slidably on shafts 182, 184, 186, 188 which are arranged parallel to the longitudinal axis of the drum. The brush assemblies then may be moved to any predetermined positions of adjustment by means of crank driven screws 190–191, 192–193, 194–195, and 196–197.

Index means are provided which correspond to the conducting pathways on the drum and which therefore may be used to register the brushes on the selected pathways.

Each brush assembly accordingly mounts a pointer, these being indicated at 198, 200, 202, 204 respectively. The pointers are arranged in pairs, each pair being placed opposite an appropriate scale 206 or 208.

The switch unit illustrated in FIG. 8 is similar to that of FIGS. 6 and 7 with the exception that the conducting material of the drum comprises light-conducting material, rather than electrically-conducting material, and the circuit altering means comprises photoelectric cells, rather than electric brushes.

Thus in housing 148 with window 149, there is provided a drum 210 rotatably mounted on shaft 212. Drum 210 is transparent to provide an area 214 for light-conducting material. This is arranged to provide pathways or segments of predetermined length and width as defined by the stepped longitudinal side edges of an area 216 which is coated with paint or other material which does not conduct light. Four photoelectric cell assemblies, two of which are indicated at 218, 220 then are slidably mounted on shafts 184, 188 in place of the electric brush means above described.

The photoelectric cells may be adjusted by means of crank-driven screws 192, 196, with the positions being indicated by pointers 202, 204 registering with a scale 208. A centrally located fluorescent tube 222 supplies the light for activating the photoelectric cells.

OPERATION

The operation of the herein described apparatus is apparent particularly from the circuit diagram of FIG. 5.

As shown in FIG. 5, there are two electric circuits. One uses low voltage alternating current and includes transformer 224, conducting plate 160 on rotor 150, brush circuit altering means 174, 176, 178, 180, ground 181 and relays 226, 228, 230, 232.

The other circuit uses high voltage, direct current and includes rectifier 234 and the magnetic clutches 130, 132, 134, 136.

In operation of the device, motor 94 drives shaft 108 continuously. This in turn drives continuously shafts 138, 140, 142, 144 associated with magnetic clutches 130, 132, 134, 136.

To set the apparatus, brushes 174, 176, 178, 180, or in the embodiment of FIG. 8, photoelectric cells 218, 220 are adjusted by means of screws 174, 176, 178, 180 until they are opposite the selected ones of electrically conducting pathways or segments 164–172 of the conducting material 160 on drum 150. These pathways may be indicated by means of pointers 198–204 working in conjunction with scales 206, 208.

Upon closing the switch circuit, motor 154 drives the rotary drum whereupon the circuits actuating the magnetic clutches are energized for a period of time commensurate with the length of the respective pathways of the conducting material on the drum. The clutches in turn actuate screw conveyors 70, 72, 74, 76 for corresponding lengths of time, discharging the feed material from compartments 32, 34, into opening 52 and from compartments 36, 38 into opening 62. Both of these may feed into a grinding or other processing unit 24 for blending and grinding the material into the finished proportioned feed mixture.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. Feeding apparatus for fluent materials, said apparatus comprising in combination:
   (a) a container adapted to hold the material and having a discharge opening,
   (b) electrically operated valve means positioned in the discharge opening,
   (c) an electric circuit including the valve means, and
   (d) drum electric switch means also in the electric circuit and including
   (e) a drum having on its periphery an area of non-conducting material and an area of conducting material providing parallel circumferential paths of varying but predetermined length, (f) electric circuit altering means responsive to said conducting material, the altering means and drum being movable relative to each other, (g) an adjustable mounting means mounting the altering means for movement longitudinally of the drum for stationing it in operative relation to a selected one of the travel paths of the conducting material, (h) the altering means, and hence the valve means, being actuated upon relative movement of the altering means and the drum for a time interval commensurate with the length of the selected travel path of the conducting material.

2. The apparatus of claim 1 wherein the fluent material is a solid fluent material and the valve means comprises electrically operated screw conveyor means.

3. The apparatus of claim 1 wherein the conducting material comprises light-conducting material and the electric circuit altering means comprises a photoelectric cell arranged to scan the conducting material upon relative movement of the cell and the drum.

4. The apparatus of claim 1 wherein the conducting material comprises electrically conducting material and the circuit altering means comprises electric brush means in the electric circuit and arranged to traverse the conducting material upon relative movement of the brush and the drum, the conducting material forming one terminal of the switch means and the brush means forming the other terminal thereof.

5. The apparatus of claim 1 wherein the conducting material comprises electrically conducting material and the circuit altering means comprises electric brush means in the electric circuit and arranged to traverse the conducting material upon relative movement of the brush and the drum, and the electrically conducting material comprising a metal sheet mounted on an electrically nonconducting base forming the circumference of the drum and provided with stepped longitudinal side edges, each step determining one of the travel paths, the conducting material forming one terminal of the switch means and the brush means forming the other terminal thereof.

6. The apparatus of claim 1 wherein the adjustable mounting means mounting the circuit altering means comprises screw means arranged longitudinally of and substantially parallel to the peripheral surface of the drum.

7. The apparatus of claim 1 wherein the container is provided with a plurality of individual compartments discharging to a common station, each compartment being provided with its own valve means individually operated by a separate electric circuit altering means each associated with a path of said conducting material, operation of the valve means thereby resulting in proportioned flow of the material to the common discharge station.

8. Feeding apparatus for fluent solid materials comprising:
(a) a container adapted to hold the material and having a discharge opening,
(b) an electrically operated screw conveyor working in the discharge opening,
(c) an electric circuit including the electrically operated screw conveyor,
(d) rotary drum electric switch means also in the electric circuit and including
(e) a rotor having on its periphery an area of electrically non-conducting material and an area of electrically conducting material providing parallel circumferential paths of varying but predetermined length,
(f) brush means positioned for contact with the surface of the conducting material,
(g) and screw means mounting the brush means, the screw means being arranged adjacent and substantially parallel to the rotor for moving the brush means longitudinally of the rotor for stationing the brush means in operative relation to a selected one of the travel paths, the conducting material forming one terminal of the switch means and the brush means forming the other terminal thereof.

9. Feeding apparatus for fluent solid materials, said apparatus comprising in combination:
(a) a container adapted to hold the material and having a discharge opening,
(b) an electrically operated screw conveyor positioned in the discharge opening,
(c) an electric circuit including the electrically operated screw conveyor,
(d) adjustable electric switch means connected to the electrically operated screw conveyor and including
(e) a rotor having on its periphery an area of light non-conducting material and an area of light-conducting material of irregular outline providing parallel circumferential paths of varying but predetermined length,
(f) a light source adjacent the rotor, photoelectric cell means stationed adjacent the rotor and responsive to the light source when beamed thereon,
(g) and adjustable mounting means mounting the photoelectric cell means for movement relative to the rotor, thereby enabling stationing the photoelectric cell means in operative relation to a selected one of the travel paths along the light-conducting material.

10. Feeding and proportioning apparatus for fluent solid materials, said apparatus comprising in combination:
(a) a container including a plurality of compartments adapted to hold solid materials of different classes, each having an opening discharging to a common station,
(b) an electrically operated screw conveyor mounted for operation in each discharge opening, each electrically operated screw conveyor having an electric circuit,
(c) and electric switch means in each electric circuit and comprising
(d) a rotor having on its periphery an area of electrically conducting material having stepped longitudinal margins providing parallel circumferential paths of varying but predetermined lengths,
(e) a plurality of electric brushes one operatively connected to each electric circuit,
(f) and adjustable mounting means mounting each brush for independent movement longitudinally of the rotor, thereby stationing each brush in operative relation to a selected one of the travel paths of the electrically conducting material, the conducting material forming one terminal of the switch means and the brush means forming the other terminal thereof.

11. An electric switch comprising
(a) a rotary drum having on its periphery an area of non-conducting material and an area of conducting material providing parallel circumferential paths of varying but predetermined lengths,
(b) electric circuit altering means responsive to the conducting material
(c) and adjustable mounting means mounting the circuit altering means for movement independently of and longitudinally of the drum to fixed positions along the length of the drum, thereby enabling stationing the circuit altering means in operative relation to a selected one of the travel paths of the conducting material.

12. The switch of claim 11 wherein the conducting material is light-conducting material and the electric circuit altering means comprises photoelectric cell means.

13. The switch of claim 11 wherein the conductive material is electrically conducting material and the circuit altering means comprises electric brush means, the conductive material forming one terminal of the switch and the brush means forming the other terminal thereof.

14. The switch of claim 11 wherein the adjustable mounting means comprises screw means arranged substantially parallel to the longitudinal axis of the drum surface.

15. The switch of claim 11 including a plurality of circuit altering members and individual adjustable mounting means therefor, thereby enabling stationing each circuit altering member in operative relation to a selected one of the travel paths of the conducting material.

References Cited by the Examiner

UNITED STATES PATENTS

| | | | |
|---|---|---|---|
| 1,176,147 | 3/1916 | Keen | 250—219.2 |
| 1,998,461 | 4/1935 | Kucher | 250—219.2 |
| 2,321,874 | 6/1943 | Tandler et al. | 250—219.2 |
| 2,750,144 | 6/1956 | Beckwith | 250—83.4 |
| 2,881,803 | 4/1959 | Koob | 200—38.2 |

FOREIGN PATENTS 1,222,652    1/1960    France.

LOUIS J. DEMBO, *Primary Examiner.*

ARCHIE R. BORCHELT, *Examiner.*